(12) United States Patent
Li et al.

(10) Patent No.: US 7,927,507 B1
(45) Date of Patent: Apr. 19, 2011

(54) HYDROGEN STORAGE COMPOSITIONS

(75) Inventors: Wen Li, El Segundo, CA (US); John J. Vajo, West Hills, CA (US); Robert W. Cumberland, Malibu, CA (US); Ping Liu, Irvine, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 12/404,201

(22) Filed: Mar. 13, 2009

(51) Int. Cl.
*C09K 3/00* (2006.01)
*C02F 5/08* (2006.01)

(52) U.S. Cl. ......... 252/182.33; 166/50; 166/57; 166/58; 166/59; 166/302; 423/413

(58) Field of Classification Search .................... 166/50, 166/57, 58, 59, 302; 252/182.33; 423/413
See application file for complete search history.

(56) References Cited

U.S. PATENT DOCUMENTS

| | | | |
|---|---|---|---|
| 4,402,933 A * | 9/1983 | de Pous | 423/658.2 |
| 6,210,498 B1 | 4/2001 | Ovshinsky et al. | |
| 6,616,891 B1 | 9/2003 | Sapru et al. | |
| 6,680,043 B2 | 1/2004 | Yebka et al. | |
| 7,108,757 B2 | 9/2006 | Huang et al. | |
| 7,341,703 B2 * | 3/2008 | Pinkerton et al. | 423/413 |
| 7,537,747 B2 * | 5/2009 | Meyer et al. | 423/413 |
| 2006/0194695 A1 * | 8/2006 | Au | 502/400 |

FOREIGN PATENT DOCUMENTS

WO WO 0214921 A1 2/2002

OTHER PUBLICATIONS

Andreas Zuttel, et al., Tetrahydroborates as new hydrogen storage materials, Scripta Materialia 56 (2007) 823-828, Elsevier Ltd.
Philippe Mauron, et al., Stability and Reversibility of LiBH4, J. Phys. Chem. B 2008, 112, 906-910, American Chemical Society.
John J. Vajo, et al., Hydrogen storage in destabilized chemical systems, Scripta Materialia 56 (2007) 829-834, Elsevier Ltd.
P. Manfrinetti, et al., Structure, transport and magnetic properties of MgNi3B2, J. Alloys and Compounds 428 (2007) 94-98, Elsevier Ltd.
J.K. Jung, et al., 11B NMR and relaxation in the MgB2 superconductor, Physical Review B, 64 (2001) 012514-1 to 012514-4, The American Physical Society.
Son-Jong Hwang, et al., NMR confirmation for formation of [B12H12]2- complexes during hydrogen desorption from metal borohydrides, J. Phys. Chem. C, 2008, 112, 3164-3169, American Chemical Society.
John J. Vajo, et al., Reversible storage of hydrogen in destabilized LiBH4, J. Phys. Chem. B, 2005, 109, 3719-3722, American Chemical Society.
Karl J. Gross, et al., On the possibility of metal hydride formation. Part I. The synthesis of MgNi3B2 by mechanical milling and sintering, J. Alloys and Compounds, 274 (1998) 234-238, Elsevier Science S.A.
H. Shao, et al., Fabrication and hydrogen storage property study of nanostructured Mg-Ni-B ternary alloys, J. Alloys and Compounds (2008).
J. A. Puszkiel, et al., Reversible hydrogen storage in metal-doped Mg-LiBH4 composites, Scripta Materialia, 2009.

* cited by examiner

*Primary Examiner* — Terressa M Boykin
(74) *Attorney, Agent, or Firm* — North Shore Assoc.

(57) ABSTRACT

Compositions for hydrogen storage and methods of making such compositions employ an alloy that exhibits reversible formation/deformation of $BH_4^-$ anions. The composition includes a ternary alloy including magnesium, boron and a metal and a metal hydride. The ternary alloy and the metal hydride are present in an amount sufficient to render the composition capable of hydrogen storage. The molar ratio of the metal to magnesium and boron in the alloy is such that the alloy exhibits reversible formation/deformation of $BH_4^-$ anions. The hydrogen storage composition is prepared by combining magnesium, boron and a metal to prepare a ternary alloy and combining the ternary alloy with a metal hydride to form the hydrogen storage composition.

20 Claims, 2 Drawing Sheets

HYDROGEN STORAGE COMPOSITIONS

STATEMENT REGARDING FEDERALLY SPONSORED RESEARCH OR DEVELOPMENT

This invention was made with government support under grant number TD0H641 awarded by the Department of Energy. The government has certain rights in this application.

CROSS-REFERENCE TO RELATED APPLICATIONS

N/A

BACKGROUND

The invention relates to hydrogen storage materials. In particular, the invention relates to reversible hydrogen storage compositions.

Hydrogen is a candidate for the next generation of energy carriers, which are needed to meet the challenges of global warming and finite fossil fuel-based energy resources. Over the years, considerable attention has been given to the use of hydrogen as a fuel or fuel supplement. While the world's oil reserves are being rapidly depleted, the supply of hydrogen is not so restricted. Hydrogen can be produced from coal, natural gas and other hydrocarbons, or formed by the electrolysis of water. Moreover hydrogen can be produced without the use of fossil fuels by methods such as the electrolysis of water using nuclear or solar energy. Furthermore, hydrogen, although presently more expensive than petroleum, is a relatively low cost fuel. Hydrogen has the highest density of energy per unit weight of most, if not all, chemical fuels. Application of hydrogen as a fuel is attractive because it generates no polluting emissions since the main by-product of burning hydrogen is water. However, the use of hydrogen as a source of energy has been hindered due to volumetric problems of storing hydrogen in gaseous or even liquid forms.

Hydrogen storage alloys have been proposed and developed to the extent of commercial use in metal hydride batteries. However, the gravimetric hydrogen storage in alloys is still low. Use of hydrogen for transportation applications requires materials that not only store hydrogen at high density but also operate reversibly at relatively low temperatures and pressures. Among many materials for hydrogen storage, complex hydrides of light metals containing borohydride anions have high hydrogen capacity and, thus, have been studied extensively. However, the thermodynamic and kinetic properties of the borohydrides limit their ability to cycle hydrogen at low temperatures. An example is $LiBH_4$. Although $LiBH_4$ has a high enthalpy of formation, $\Delta H_f = -194.2$ kJ/mol, the formation of $LiBH_4$ from LiH+B or Li+B still requires elevated temperatures and pressures indicating a significant activation energy barrier. The reason for the high energy barrier has been suggested to be the general chemical inertness of boron, which may be due to the strong bonds in elemental boron ($\Delta H_{B(s) \rightarrow B(g)} = 560$ kJ/mol).

Considerable effort has been devoted to the development of materials that can lead to the reversible formation of borohydride anions at lower temperatures. However, even with the use of $MgB_2$, a reduction of the temperature for reversible dehydrogenation of $LiBH_4$ of only about 200° C. (from 600° C. to about 400° C.) has been realized in a $MgB_2/LiBH_4$ hydrogen storage system. Thus, despite this effort, the reversible temperature for borohydride-based materials is still too high, for example, for an ideal hydrogen storage system for vehicles.

SUMMARY

An embodiment of the present invention is directed to a hydrogen storage composition comprising: (a) a ternary alloy comprising magnesium, boron and a metal and (b) a metal hydride. The ternary alloy and the metal hydride are in an amount sufficient to render the composition capable of hydrogen storage. The molar ratio of the metal to magnesium and boron in the alloy is such that the alloy exhibits reversible formation/deformation of $BH_4^-$ anions.

Another embodiment of the present invention is a hydrogen storage composition comprising: (a) a ternary alloy of the formula: $Mg_kM_nB_m$ and (b) a metal hydride. The ternary alloy and the metal hydride are in an amount sufficient to render the composition capable of hydrogen storage. In the formula: $Mg_kM_nB_m$, k, m and n represent molar ratios, k is a number between 1 and 50 including fractions thereof, m is a number between 1 and 15 including fractions thereof, n is a number between 1 and 50 including fractions thereof, and M is a metal selected from the group consisting of metals of Groups 1-2, Periods 2-6, Groups 3-12, Periods 4-6, Group 13, Periods 3-6, Group 14, Periods 4-6 and Group 15, Periods 4-6, of the Standard Periodic Table and combinations of two or more of the metals. The metal of the metal hydride is independently selected from the group consisting of metals of Groups 1, 2, 13 and Group 3-12, Period 4, of the Standard Periodic Table.

Another embodiment of the present invention is a method of preparing a hydrogen storage composition. Magnesium, boron and a metal are combined to prepare a ternary alloy. The molar ratio of the metal to magnesium and boron in the alloy is sufficient to tune a chemical reactivity of the boron to enhance activity of an active boron species for the reversible formation/deformation of $BH_4^-$ anions. The alloy is combined with a metal hydride to form the hydrogen storage composition. The ternary alloy and the metal hydride are in an amount sufficient to render the composition capable of hydrogen storage.

BRIEF DESCRIPTION OF THE DRAWINGS

The drawings provided herein are for the purpose of facilitating the understanding of certain embodiments of the present invention and are provided by way of illustration and not limitation on the scope of the appended claims.

DESCRIPTION OF SPECIFIC EMBODIMENTS

Figure 1:
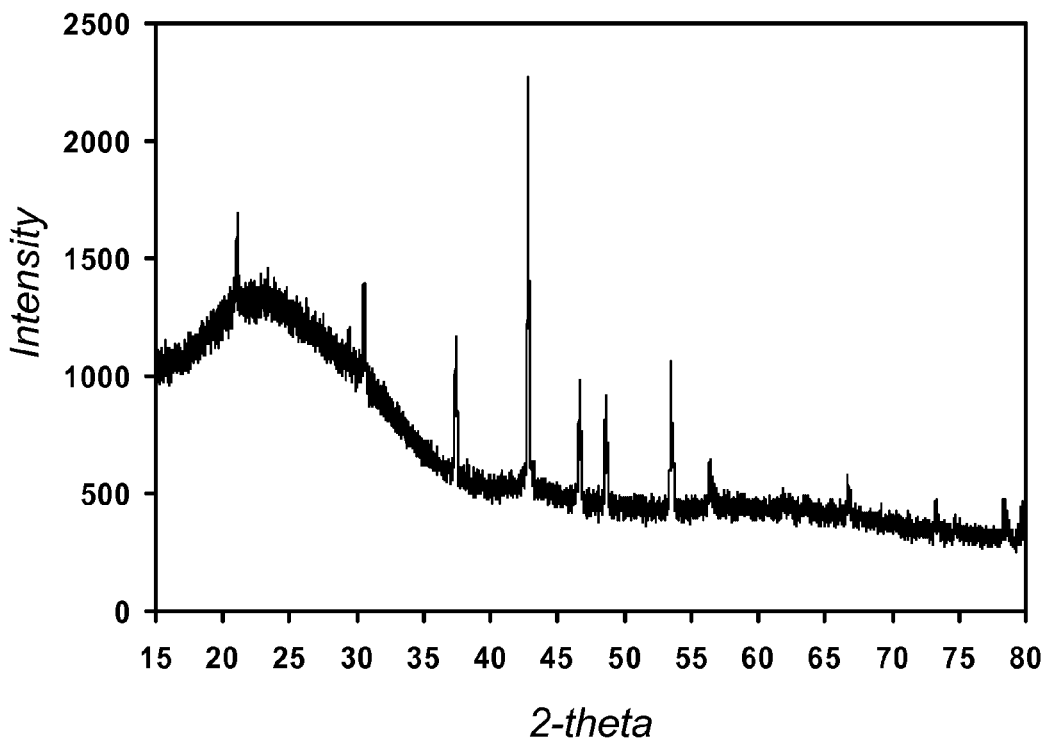
FIG. 1 is an X-ray Diffraction (XRD) spectrum of $MgNi_{2.5}B_2$ prepared as described in Example 1 below according to an embodiment of the present invention.

Embodiments of the present invention are directed to hydrogen storage materials. In some embodiments, the hydrogen storage materials comprise (i) a ternary alloy comprising magnesium, a metal and boron and (ii) a metal hydride, for example, LiH, $MgH_2$. The boron species in the borides can be cycled in the presence of the metal hydrides to form borohydride ($BH_4^-$) anions under certain hydrogenation and dehydrogenation conditions at low temperature. The present embodiments permit tuning of the chemical reactivity of boron by the metal to provide suitable boron species for generating hydrogen reversibly from the borohydride anions. These boron species are more active at low temperature than those produced with the known $MgB_2/LiBH_4$ hydrogen storage system.

The present embodiments provide for lowering of the hydrogenation/dehydrogenation enthalpy (or activation energy) of the $BH_4^-$ anion in embodiments of the present hydrogen storage compositions, thus, lowering the temperature for charging and discharging the hydrogen storage materials, i.e., decreasing hydrogen cycling temperature. In addition, the reversible hydrogen capacity of the $BH_4^-$ anion of embodiments of the present hydrogen storage compositions is maximized at low temperature. The present embodiments allow for reduction of cost and improvement of energy efficiency for the hydrogen storage system comprising the $BH_4^-$ anion, which is important for the utilization of such materials for future fuel cell vehicles.

As mentioned above, one embodiment of the present invention is directed to a hydrogen storage composition comprising (a) a ternary alloy comprising magnesium, boron and a metal and (b) a metal hydride wherein the ternary alloy and the metal hydride are present in an amount sufficient to render the composition capable of hydrogen storage. The molar ratio of the metal to magnesium and boron in the alloy is such that the alloy exhibits reversible formation/deformation of $BH_4^-$ anions upon hydrogenation of the composition.

In some embodiments the metal is selected from the group consisting of metals of Groups 1-2, Periods 2-6, Groups 3-12, Periods 4-6, Group 13, Periods 3-6, Group 14, Periods 4-6, and Group 15, Periods 4-6, for example, of the Standard Periodic Table and combinations of two or more of the aforementioned metals. In some embodiments the metal is a metal of Groups 1-2, Periods 2-5, or Groups 3-12, Periods 4-5, or Group 13, Periods 3-4, or Group 14, Period 5, or Group 15, Period 6, for example, of the Standard Periodic Table or a combination of two or more of the aforementioned metals. In some embodiments metal M is, for example, Li, Na, K, Rb, Be, Mg, Ca, Sr, Sc, Ti, V, Cr, Mn, Fe, Co, Ni, Cu, Zn, Y, Zr, Nb, Mo, Tc, Ru, Rh, Pd, Ag, Cd, Al, Ga, Sn, or Bi or a combination thereof, i.e., the metal may comprise more than one metal. In some embodiments metal M is Ni, Fe, Co or Cu.

As mentioned above, the molar ratio of the metal to magnesium and boron in the alloy is such that the alloy exhibits reversible formation/deformation of $BH_4^-$ anions upon hydrogenation of the composition. "Reversible formation/deformation" means that the boron species, namely, $BH_4^-$ anions, can form and deform in cycles that comprise a step of formation of the boron species from the boron of the alloy and hydrogen of the metal hydride plus infused hydrogen (hydrogenation) and a step of deformation of the boron species into boron of the metal alloy with release of hydrogen (dehydrogenation). The hydrogenation and dehydrogenation conditions depend on the composition of the alloy, the molar ratio of the components of the alloy, the nature of the metal hydride or metal hydrides, for example.

In some embodiments the hydrogenation conditions include, by way of illustration and not limitation, heating the composition in the presence of hydrogen to a temperature of about 250° C. to about 400° C., or about 275° C. to about 375° C., or about 300° C. to about 350° C., for example, at a rate of about 0.5° C. to about 5° C. per minute, or about 1° C. to about 4° C. per minute, or about 1.5° C. to about 3° C. per minute, or about 2° C. to about 2.5° C. per minute, for example. In some embodiments the pressure of the hydrogen is about 20 to about 150 bar, or about 40 to about 125 bar, or about 50 to about 100 bar, or about 50 to about 90 bar, or about 40 to about 90 bar, or about 30 to about 90 bar, or about 30 to about 100 bar, or about 20 to about 100 bar, or about 20 to about 90 bar, or about 20 to about 80 bar, for example. The composition is then held at the temperature for a period of about 10 minutes to about 10 hours, or about 30 minutes to about 5 hours, or about 30 minutes to about 4 hours, or about 30 minutes to about 3 hours, or about 1 hour to about 10 hours, or about 1 hour to about 5 hours, or about 1 hour to about 4 hours, or about 1 hour to about 3 hours, for example.

Following the heating procedure, the composition is cooled slowly to a temperature, for example, of about 10 to about 100° C., or about 15 to about 75° C., or about 20 to about 50° C., or about 20 to about 30° C., or ambient temperature, which is normally room temperature. In some embodiments the rate of cooling is about 0.5 to about 5° C. per minute, or about 1 to about 4° C. per minute, or about 1.5 to about 3° C. per minute, or about 2 to about 2.5° C., for example. The amount of hydrogen absorbed is dependent on the nature and composition of the alloy and the nature of the metal hydride(s), for example.

In some embodiments the dehydrogenation conditions include, by way of illustration and not limitation, heating the composition to a temperature of about 250° C. to about 400° C., or about 275° C. to about 390° C., or about 300° C. to about 350° C., or about 300° C. to about 400° C., or about 275° C. to about 400° C., for example, at a rate of about 0.5° C. to about 5° C. per minute, or about 1° C. to about 4° C. per minute, or about 1.5° C. to about 3° C. per minute, or about 2° C. to about 2.5° C. per minute, for example. In some embodiments the rate of heating is a constant rate. The composition is then held at the temperature for a period of about 10 minutes to about 10 hours, or about 30 minutes to about 5 hours, or about 30 minutes to about 4 hours, or about 30 minutes to about 3 hours, or about 1 hour to about 10 hours, or about 1 hour to about 5 hours, or about 1 hour to about 4 hours, or about 1 hour to about 3 hours, for example. In some embodiments the overpressure of the hydrogen (i.e., the pressure of the applied hydrogen) during the heating period is about 1 to about 5 bar, or about 1 to about 4 bar, or about 1 to about 3 bar, or about 1 to about 2 bar, or about 2 to about 5 bar, or about 2 to about 4 bar, or about 2 to about 3 bar, or about 1 to about 10 bar, or about 2 to about 10 bar, or about 3 to about 8 bar, for example.

A hydrogenation step utilizing embodiments of the present compositions, which result in the formation of a borohydride anion, may be represented by the following general equation:

$$\alpha Mg_k M_n B_m + \beta M^h_{\ p} H_q + \epsilon H_2 \rightarrow \delta M^h_{\ p'} BH_4^- + \phi Mg_{k'} M_{n'} E_{q'}.$$

wherein k, n, m and M are as defined above, $M^h$ is a metal as defined above for the metal of a metal hydride, p, q, p', k', n' and q' represent molar ratios, p is a number between 1 and 10, q is a number between 1 and 10, p' is a number between 1 and 10, k' is a number between 1 and 10, n' is a number between 1 and 15, q' is a number between 1 and 20, and α, β, δ, ε and φ are each independently a number that satisfies the stoichiometry requirements of the above equation.

The dehydrogenation step involves deformation of the borohydride anion in a reverse of the above equation. Decomposition of the metal hydride is also involved in the dehydrogenation step.

In some embodiments two metal hydrides are employed and the hydrogenation step utilizing embodiments of the present composition may be represented by the following general equation:

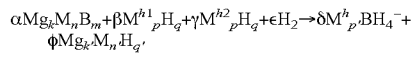
$$\alpha Mg_k M_n B_m + \beta M^{h1}{}_{p'} H_{q'} + \gamma M^{h2}{}_{p'} H_{q'} + \epsilon H_2 \rightarrow \delta M^h{}_{p'} BH_4^- + \phi Mg_k M_n H_{q'}$$

wherein k, n, m, p, q, p', k', n' and q' are as defined above, M is a metal and may be, for example, Ni, Cu, Fe, $M^{h1}$ is a first metal as defined above for the metal of a first metal hydride and may be, for example, Li, Mg, Ca or Al, $M^{h2}$ is a second metal as defined above for the metal of a second metal hydride and may be, for example, Li, Mg, Ca or Al, with the proviso that $M^{h1}$ and $M^{h2}$ are not the same, and α, β, δ, γ, ε and φ are each independently a number that satisfies the stoichiometry requirements of the above equation.

As mentioned above, the molar ratio of the metal to magnesium and boron in the alloy is such that the alloy exhibits reversible formation/deformation of $BH_4^-$ anions upon hydrogenation of the composition. The moles of metal may be selected to tune the chemical activity of the boron in the alloy to achieve the targeted result. By the phrase "tune the chemical activity" is meant that the molar ratios are adjusted to provide a suitable boron species for generating hydrogen reversibly from borohydride anions and rendering the boron species more active at low temperature (i.e., to lower the activation energy of the borohydride anions) than those boron species produced with the known $MgB_2$ system. Without being limited by any theory of operation, the metals that comprise various embodiments of the present compositions further activate the B (maybe its electronic density) in the present alloys so as to enhance reversible formation and deformation the $BH_4^-$ anions at low temperature. By the phrase "low temperature" is meant a temperature below the reversible temperature of $BH_4^-$ anions in the known $MgB_2$ system, which is about 400° C.; in some embodiments the temperature is below about 400° C., or below about 375° C., or below about 350° C., or below about 325° C., or below about 300° C., or below about 275° C., or below about 250° C., or below about 225° C., or below about 200° C., or below about 175° C., or below about 150° C., or below about 125° C., or below about 100° C., for example.

The considerations involved in selecting the molar ratio of the components of the alloy include, for example, the nature of the metal, the molar ratio of the components of the alloy, and the nature of the metal hydride of the composition comprising the alloy and the metal hydride(s).

Referring to the formula $Mg_k M_n B_m$, in some embodiments, k is a number between 1 and 50, or between 1 and 45, or between 1 and 40, or between 1 and 35, or between 1 and 30 or between 1 and 25, or between 1 and 20, or between 1 and 15, or between 1 and 10, or between 1 and 9, or between 1 and 8, or between 1 and 7, or between 1 and 6 or between 1 and 5, or between 1 and 4, or between 1 and 3, or between 1 and 2, and includes fractions thereof; m is a number between 1 and 15, or between 1 and 14, or between 1 and 13, or between 1 and 12, or between 1 and 11, or between 1 and 10, or between 1 and 9, or between 1 and 8, or between 1 and 7, or between 1 and 6 or between 1 and 5, or between 1 and 4, or between 1 and 3, or between 1 and 2, or between 2 and 14, or between 2 and 13, or between 2 and 12, or between 2 and 11, or between 2 and 10, or between 2 and 9, or between 2 and 8, or between 2 and 7, or between 2 and 6 or between 2 and 5, or between 2 and 4, or between 2 and 3, and includes fractions thereof. n is a number between 1 and 50, or between 1 and 45, or between 1 and 40, or between 1 and 35, or between 1 and 30, or between 1 and 25, or between 1 and 20, or between 1 and 19, or between 1 and 18, or between 1 and 17, or between 1 and 16, or between 1 and 15, or between 1 and 14, or between 1 and 13, or between 1 and 12, or between 1 and 11, or between 1 and 10, or between 1 and 9, or between 1 and 8, or between 1 and 7, or between 1 and 6 or between 1 and 5, or between 1 and 4, or between 1 and 3, or between 1 and 2, or between 2 and 20, or between 2 and 19, or between 2 and 18, or between 2 and 17, or between 2 and 16, or between 2 and 15, or between 2 and 14, or between 2 and 13, or between 2 and 12, or between 2 and 11, or between 2 and 10, or between 2 and 9, or between 2 and 8, or between 2 and 7, or between 2 and 6 or between 2 and 5, or between 2 and 4, or between 2 and 3, and includes fractions thereof. In some embodiments k is between 1 and about 20, m is between 1 and about 15 and n is between about 1 and 25. In some embodiments k is between 1 and about 10, m is between 1 and about 5 and n is between about 1 and 10. In some embodiments, k is 1, n is 2.5 or 3, and m is 2. In some embodiments the molar ratio is based on the following relationship: 0<k<1, 0<n<1, 0<m<1, and k+n+m=1. In some embodiments the alloy is a single phase ternary alloy, $MgNi_x B_2$, with x being between approximately 1.5-2 and about 3.

The word "between" as used herein includes the lower and upper limits of the range as well as the numbers in between; for example, the phrase "between 1 and 10" includes 1 and 10 as well as 2-9 and also includes fractions of 1 through 10. The phrase "at least" as used herein means that the number of specified items may be equal to or greater than the number recited. The phrase "about" as used herein means that the number recited may differ by plus or minus 10%; for example, "about 5" means a range of 4.5 to 5.5. As used herein, the singular forms "a", "an" and "the" include plural referents unless the content clearly dictates otherwise. In some embodiments, "a" or "an" as used herein means "at least one" or "one or more."

Embodiments of the present hydrogen storage compositions further comprise a metal hydride in an amount sufficient to render the composition capable of hydrogen storage. In some embodiments the metal of the metal hydride is independently a metal of Groups 1, 2 or 13 or Groups 3-12, Period 4, of the Standard Periodic Table. In some embodiments the metal of the metal hydride is independently a metal of Groups 1, 2 or 13 of the Standard Periodic Table. In some embodiments the metal of the metal hydride is Li, Mg, Ca or Al. In some embodiments the metal of the metal hydride is Li or Mg. The number of metal hydrides in the hydrogen storage compositions is dependent on, for example, the nature of the metal hydride and/or the nature of the alloy. In some embodiments the number of metal hydrides in the hydrogen storage composition may be 1, or 2, or 3, or 4, or 5, or 6, or 7, for example. The phrase "capable of hydrogen storage" means that the composition is capable of storing at least 1%, or at least 1.5%, or at least 2%, or at least 2.5%, or at least 3%, or at least 3.5%, or at least 4%, or at least 4.5%, for example.

As mentioned above, the metal hydride is present in an amount sufficient to render the composition capable of hydrogen storage. The amount of the metal hydride is dependent on, for example, one or more of the nature of the metal hydride, the nature of the metal in the alloy, the molar ratio of the components of the alloy, the amount of the alloy in the composition, and the hydrogenation reaction equation. In some embodiments, the amount of the metal hydride in the hydrogen storage composition is about 1 to about 5 moles or more per mole of alloy, or about 1 to about 4 moles or more per mole of alloy, or about 2 to about 4 moles per mole of alloy, for example.

In some embodiments the hydrogen storage composition is prepared by preparing the ternary alloy and then combining the alloy with the metal hydride. A "ternary alloy" as used herein is an alloy comprising three metal components, which are in ternary alloy form as demonstrated by X-ray Diffraction (XRD) spectra. The XRD spectra of the ternary alloy exhibits characteristics shown in the XRD spectrum set forth in FIG. 1. The ternary alloys in accordance with the present embodiments are formed at high temperature, i.e., temperatures greater that about 500° C., or greater than about 600° C., or greater than about 700° C., or greater than about 800° C., for example. The present ternary alloys are to be distinguished from alloys comprising three components where the XRD does not exhibit characteristics of a ternary alloy. Such alloys are those prepared a low temperature, i.e., temperatures lower than about 200° C., or lower than about 150° C., or lower than about 100° C., or lower than about 50° C., or at room temperature, for example.

In some embodiments the present ternary alloy is prepared by combining the individual elemental metals, usually in powder form, where the amount of each is selected to achieve the desired molar ratio of magnesium, boron and metal. The combination is treated at a temperature and for a time period sufficient to form a ternary alloy as defined above. In some embodiments the metal is combined with a preformed composition of magnesium and boron and the combination is heated at a temperature and for a time sufficient to form a ternary alloy. In some embodiments the ternary alloy is prepared by combining the metal in powder form with a magnesium boride compound in powder form where the amount of each is selected to achieve the desired molar ratio of magnesium, boron and metal in the resulting alloy and the resulting alloy is a ternary alloy. In some embodiments the particles are nanoparticle size.

In some embodiments the combination of powders is heated at high temperature for a period of time to achieve alloy formation. Heating may be conducted in the presence of an inert gas such as, for example, nitrogen or a noble gas (e.g., helium, argon, neon, etc.) in the absence of oxygen and water (<1 ppm). The mixture is then placed in an appropriate vessel, which is sealed, and the mixture is heated, by way of example and not limitation, at a temperature of about 500 to about 1500° C., or about 600 to about 1400° C., or about 700 to about 1300° C., or about 800 to about 1200° C., or about 900 to about 1000° C., or about 500 to about 1000° C., or about 600 to about 1000° C., or about 700 to about 1000° C., or about 800 to about 1000° C., for a period of about 5 to about 40 hours, or about 10 to about 30 hours, or about 15 to about 30 hours, or about 20 to about 25 hours, for example. In some embodiments the powder mixture is subjected to a mechanical milling process such as, for example, a ball milling process, prior to the heating step. The powders are mixed and milled in a suitable milling apparatus such as, for example, a planetary mill with an agate milling vessel and silicon nitride milling balls, for example. The milling is carried out for a period of about 30 minutes to about 6 hours or more, or about 45 minutes to about 5 hours, or about 60 minutes to about 4 hours, for example.

In a next step in the preparation of the hydrogen storage composition, the above ternary alloy powder is combined with metal hydride in powder form and the mixture is subjected to mechanical milling using an appropriate milling apparatus and procedure such as, for example, a hardened steel milling vessel with milling balls. The number of moles of the alloy and the number of moles of the metal hydride are discussed above.

The hydrogen storage composition prepared as described above may be hydrogenated by (i) heating the composition under pressure in the presence of hydrogen at a temperature and for a period sufficient for the composition to absorb hydrogen and (ii) slowly cooling the composition to ambient temperature. In some embodiments the composition is hydrogenated in a suitable reaction vessel such as, for example, a volumetric gas apparatus. The composition is subjected to heating under hydrogen pressure for a time and at a temperature to achieve the desired level of hydrogenation. Embodiments of such conditions are set forth above by way of illustration and not limitation. It some embodiments a substantial reduction in the pressure employed in the hydrogenation step may be achieved and, thus, the lower limits of the ranges set forth above may be decreased in some embodiments.

As can be seen from the above, when embodiments of the present hydrogen storage composition are hydrogenated, the materials formed may include borohydride anion-containing materials and metal hydrides, which differ from the metal hydrides of the initial hydrogen storage composition. In some embodiments there is more than one step in the dehydrogenation reaction. This unique property permits enhancement of the hydrogen capacity of the hydrogen storage composition. The metal hydrides are formed because the active boron species is released from the material to form borohydride anions under hydrogenation conditions. Another aspect of the hydrogenation is that the materials may not be fully hydrogenated because the boron species may become less active in the materials while a part of the boron and a part of the other metals reacts to form $BH_4^-$ anions and metal hydrides, respectively, under hydrogenation conditions. As a result, the remaining inert phases may act as seeds to grow active phases of the magnesium-based metal borides during dehydrogenation, which makes embodiments of the present hydrogen storage compositions reversible.

In a specific embodiment the hydrogenation of a hydrogen storage composition may be represented by the following equation:

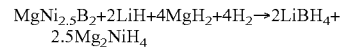
$$MgNi_{2.5}B_2 + 2LiH + 4MgH_2 + 4H_2 \rightarrow 2LiBH_4 + 2.5Mg_2NiH_4$$

wherein the hydrogen storage composition is $MgNi_{2.5}B_2/2LiH/4MgH_2$.

In another specific embodiment the hydrogenation of a hydrogen storage composition may be represented by the following equation:

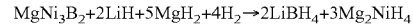
$$MgNi_3B_2 + 2LiH + 5MgH_2 + 4H_2 \rightarrow 2LiBH_4 + 3Mg_2NiH_4$$

wherein the hydrogen storage composition is $MgNi_3B_2/2LiH/5MgH_2$.

In another specific embodiment the hydrogenation of a hydrogen storage composition may be represented by the following equation:

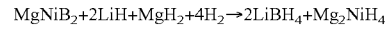
$$MgNiB_2 + 2LiH + MgH_2 + 4H_2 \rightarrow 2LiBH_4 + Mg_2NiH_4$$

wherein the hydrogen storage composition is $MgNiB_2/2LiH/MgH_2$.

It should be noted that parameters for some embodiments may vary from the various parameters recited herein depending on one or more of the nature and composition of the ternary alloy, the molar ratio of the components of the ternary alloy, the nature and composition of the metal hydride, the amounts of the ternary alloy and metal hydride of the hydrogen storage composition, for example. Therefore, the parameters recited herein are set forth in illustrative manner as guidance to one of ordinary skill in the art.

EXAMPLES

Unless otherwise indicated, materials in the experiments below were purchased from Aldrich Chemical Company, St. Louis Mo.

Example 1

Preparation of $MgNi_{2.5}B_2$ $MgNi_{2.5}B_2$ was prepared from a 1:2.5 molar ratio mixture of $MgB_2$ powder:Ni powder. Specifically, 0.54 grams (g) of $MgB_2$ was mixed with 1.71 g of Ni metal. This mixture was then ground for 60 minutes (2×30 minute sessions) at 400 RPM in an agate milling vessel (sealed under Ar). The mixture was then placed in a stainless steel tube, which was sealed under an Ar atmosphere with swagelok caps on both ends. The tube was held at 975° C. for 24 hours (the ramp up time from room temp to 975° C. was 3 hours). FIG. 1 shows the XRD spectrum of the sample, which indicates that the product has the same structure as $MgNi_{2.5}B_2$ in The International Centre for Diffraction Data (ICDD), 2007, database. For the product alloy ($MgNi_{2.5}B_2$), the weight percentages of Mg, Ni, and B were 12.6%, 76.2%, and 11.2%, respectively.

Example 2

$MgNi_{2.5}B_2$/LiH/$MgH_2$ Hydrogen Storage System

The $MgNi_{2.5}B_2$/LiH/$MgH_2$ hydrogen storage composition contained 0.8 moles of LiH, 1.6 moles of $MgH_2$, and 0.4 of moles of $MgNi_{2.5}B_2$. Powdered LiH with a purity of 97% was obtained from Fluka Chemical, a division of Sigma-Aldrich, St. Louis Mo. The combination was based on an assumption of the following reaction:

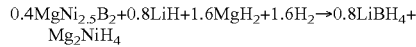
$0.4MgNi_{2.5}B_2 + 0.8LiH + 1.6MgH_2 + 1.6H_2 \rightarrow 0.8LiBH_4 + Mg_2NiH_4$ The sample of $MgNi_{2.5}B_2$ was prepared as described in Example 1. A mixture of 0.06 grams LiH, 0.402 grams $MgH_2$, and 0.737 grams $MgNi_{2.5}B_2$ was mechanically milled in an 80 cm³ hardened-steel milling vessel with thirty-7 mm diameter Cr-steel milling balls using a Frisch P6 planetary mill operated at 400 rpm for 1 hr. All material handling was performed in an argon filled glove box with <1 ppm oxygen and water concentrations.

After milling, the mixture was hydrogenated in a volumetric gas apparatus to give a hydrogen storage system (hydrogenated $MgNi_{2.5}B_2$/LiH/$MgH_2$). The hydrogenation treatment consisted of exposing the mixture to 100 bar of hydrogen gas, heating at 2° C./min to 350° C., holding the temperature constant for 4 hours, and slowly cooling to room temperature.

Figure 2:
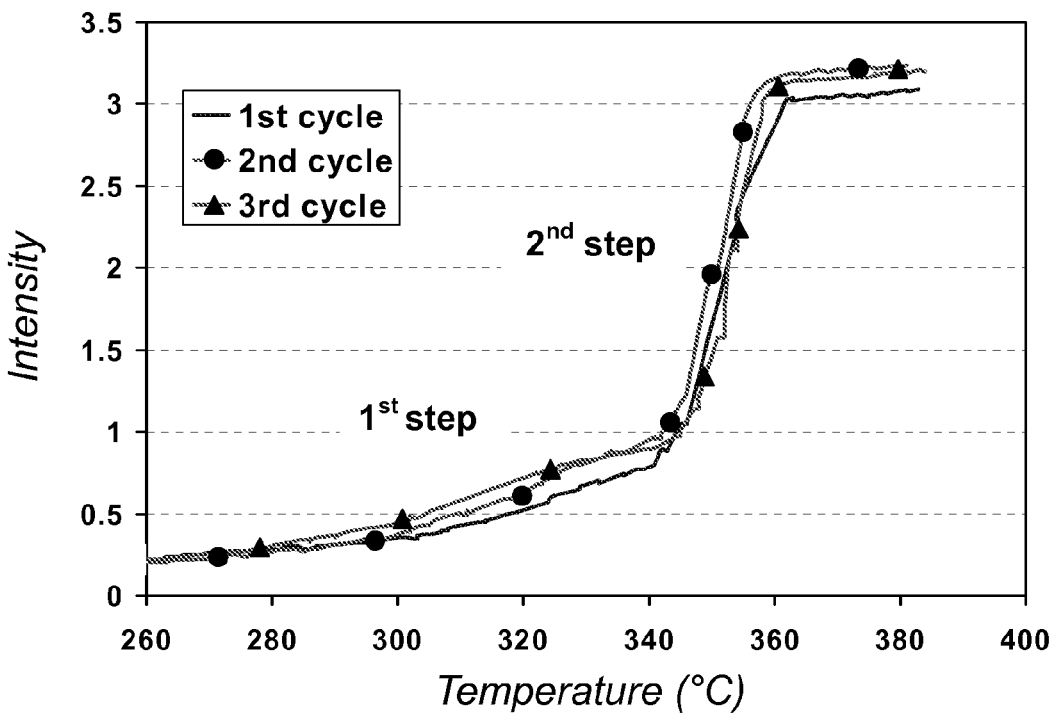
FIG. 2 is a graphic depiction of dehydrogenation of an embodiment of a hydrogen storage composition, namely, $MgNi_{2.5}B_2/LiH/MgH_2$, as discussed in Example 2 below according to an embodiment of the present invention.

After hydrogenation, the dehydrogenation behavior was examined using the same volumetric gas apparatus as discussed above. FIG. 2 shows the amount of desorbed hydrogen in weight percent as a function of temperature during heating to 380° C. at a constant rate of 2° C./min and then holding the temperature constant in an overpressure of 4 bar of hydrogen. Desorption of hydrogen occurred in two reaction steps. The first step started at about 280° C. and ended at about 340° C. The first step released about 0.9 wt % hydrogen and corresponded to the reverse of the storage reaction set forth above. The difference between the theoretical capacity and the observed capacity may be due in part to the purity of the reactants; this difference indicated that the hydrogenation reaction did not proceed to completion. The second step was sharp and occurred with a midpoint temperature of about 350° C. and released about 2.3 wt % hydrogen. This step was consistent with dehydrogenation of $MgH_2$ occurring into a hydrogen overpressure of 4 bar. After the second step a total of about 3.2 wt % hydrogen was released.

FIG. 2 also shows that the $MgNi_{2.5}B_2$/LiH/$MgH_2$ hydrogen storage system stored hydrogen reversibly. After dehydrogenation, the system was rehydrogenated by exposure to 100 bar of hydrogen at 350° C. for 4 hr. The reversibility of the system was very similar, i.e., the $2^{nd}$ and $3^{rd}$ dehydrogenation cycles showed no loss in capacity according to the data shown in FIG. 2. As can be seen, there was a slight decrease in the temperature of the first desorption step from the $1^{st}$ desorption to the $3^{rd}$ desorption, which implied that the system was improved with cycling.

Figure 3:
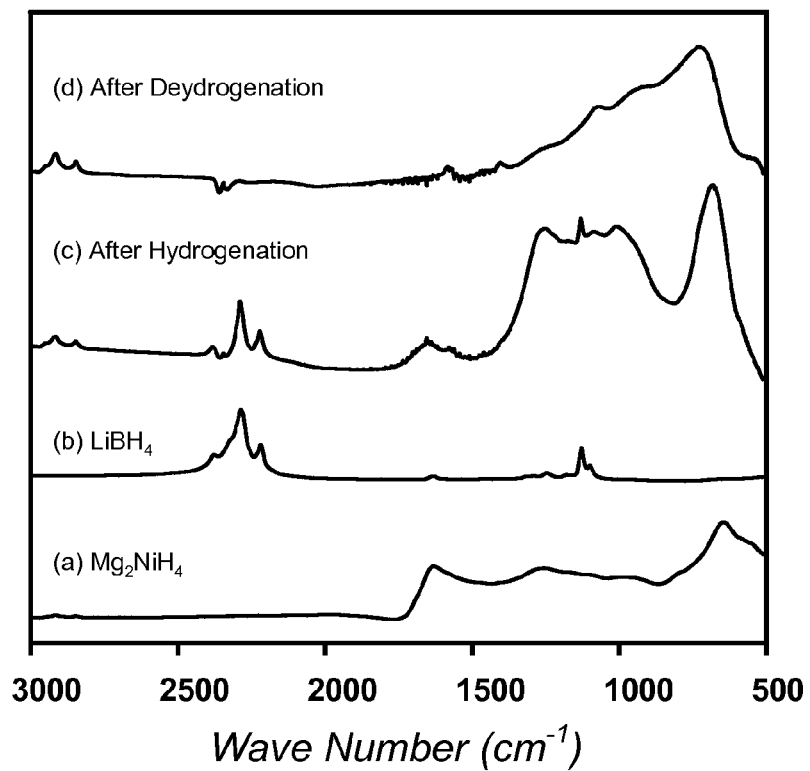
FIG. 3 depicts Fourier Transform Infrared (FTIR) spectra of (a) a $Mg_2NiH_4$ standard, (b) a $LiBH_4$ standard, (c) an embodiment of a hydrogen storage composition, namely, $MgNi_{2.5}B_2/LiH/MgH_2$, in accordance with the present invention, and (d) the hydrogen storage composition of (c) after hydrogenation according to an embodiment of the present invention.

FIG. 3 shows Fourier Transform Infrared (FTIR) spectra for a comparison study of standards and the $MgNi_{2.5}B_2$/LiH/$MgH_2$ hydrogen storage composition of Example 2 above. In comparison with the $LiBH_4$ standard, the sharp peaks in the mixture at 2100-2400 cm$^{-1}$ and 1100 cm$^{-1}$ confirmed the presence of $LiBH_4$. In comparison with the $Mg_2NiH_4$ standard, the broad peaks at 1500-1700 cm$^{-1}$ and 500-700 cm$^{-1}$ confirmed the presence of $Mg_2NiH_4$. The Infrared (IR) results showed that $BH_4^-$ anions and $Mg_2NiH_4$ were formed after hydrogenation and disappeared after dehydrogenation. The infrared absorption at about 1645 cm$^{-1}$ is reported to be the infrared absorption for bulk $Mg_2NiH_4$. The peak at 1126 cm$^-$ corresponds to a $BH_2$ deformation, and the three peaks at about 2225 cm$^{-1}$, 2291 cm$^{-1}$ and 2387 cm$^{-1}$ were assigned to B-Ht (terminal) stretching. The FTIR spectrum of the dehydrogenated sample (FIG. 3, line (d)) shows that the $LiBH_4$ and $Mg_2NiH_4$ have reacted essentially completely.

Based on the results in FIG. 3, the second desorption step in FIG. 2 was assigned to hydrogen desorption from $MgH_2$ and remaining $Mg_2NiH_4$. Therefore, the first step desorption in FIG. 2 was assigned to the decomposition of $LiBH_4$. As compared to the known LiH/$MgB_2$ system, the reversible temperature of $LiBH_4$ with the present hydrogen storage composition was reduced from 400° C. to about 280° C.

Figure 4:
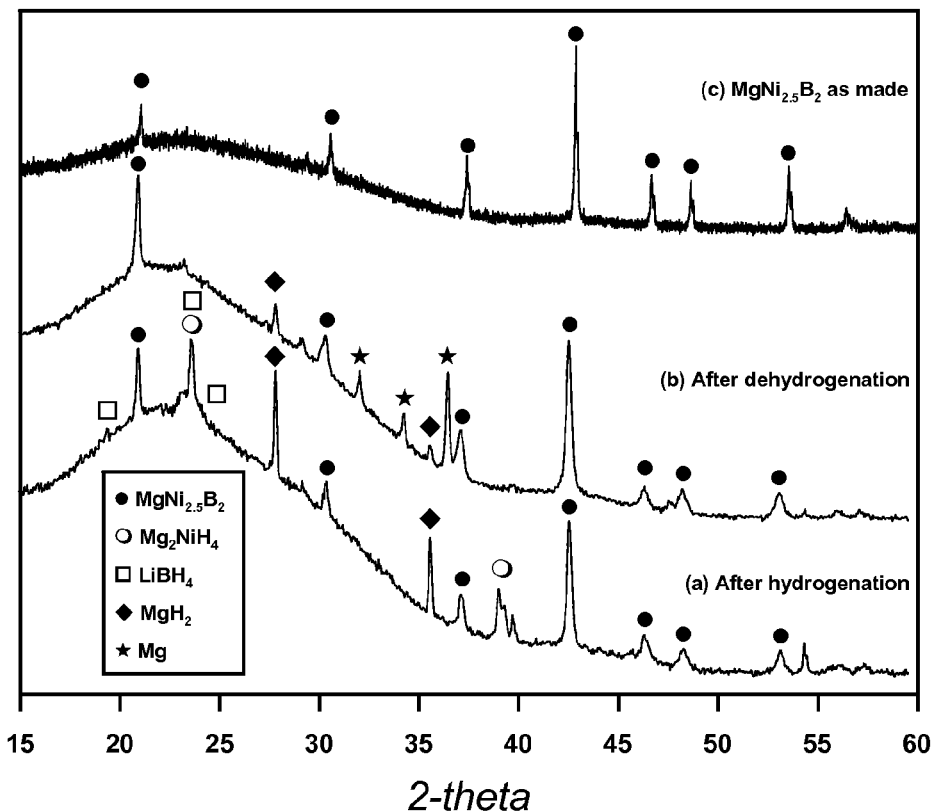
FIG. 4 depicts XRD spectra (a) after dehydrogenation of an embodiment of a hydrogen storage composition in accordance with the present invention, namely, $MgNi_{2.5}B_2/LiH/MgH_2$ prepared as described below in Example 2, (b) after dehydrogenation of the hydrogenated $MgNi_{2.5}B_2/LiH/MgH_2$ hydrogen storage composition of (a), and (c) $MgNi_{2.5}B_2$ pre-

FIG. 4 shows the X-ray Diffraction (XRD) spectra of the $MgNi_{2.5}B_2$/LiH/$MgH_2$ hydrogen storage composition in accordance with an embodiment of the present invention and as prepared in Example 2 above. After the composition was hydrogenated under 100 bar of hydrogen at 350° C. for 4 hours, the crystal structure showed the formation of $Mg_2NiH_4$ and a trace amount of $LiBH_4$ phases, while the remaining un-reacted $MgNi_{2.5}B_2$ and $MgH_2$ were observed in the same time frame as discussed above. Because the desorption temperatures for $MgH_2$ and $Mg_2NiH_4$ are very close, the second step desorption may contain the released hydrogen from both of $Mg_2NiH_4$ and $MgH_2$ phases. After dehydrogenation at 380° C. and 4 bar of hydrogen, the phases of $Mg_2NiH_4$ and $LiBH_4$ disappeared. Apparently, the $MgNi_{2.5}B_2$ phases increased after the dehydrogenation. There was a small $MgH_2$ phase observed in the dehydrogenated phases, which was believed to originate by re-hydrogenation during sample cooling under the 4 bar hydrogen. In the dehydrogenated phase, the Mg phase was clearly seen.

In view of the above, after hydrogenation, diffraction peaks occurred for $Mg_2NiH_4$ and $LiBH_4$. There were also diffraction peaks for unreacted $MgH_2$ and the ternary boride phase.

However, the composition of the remaining ternary boride phase appeared to differ from the original composition because, as discussed below, identical diffraction patterns were found for ternary borides with a range of Ni concentrations. The unreacted ternary boride may act as seeds for the further growth of the ternary boride phase during dehydrogenation, thereby reducing the reaction temperature. After dehydrogenation (FIG. 3, line (b)), the $Mg_2NiH_4$ and $LiBH_4$ reacted completely in the second dehydrogenation step forming Mg metal.

Example 3

Using the same procedure as described above in Examples 1-2, other hydrogen storage compositions were prepared. $MgB_2$ and Ni alloys were prepared with the following molar amounts of Ni, i.e., $MgB_2+xNi$ (x=0.5, 0.75, 1.0, 2.0, 3.0). Known ternary borides, $Mg_2Ni_5B_4$, $MgNi_3B_2$ and MgNiB, have been reported to belong to a hexagonal crystal structure with similar lattice constants. The materials prepared above had substantially the same XRD patterns for all of the compositions studied except for slight peak shifts (FIG. 1). In addition, for x=3.0, there were peaks from $Ni_2B$ and an unidentified phase, which suggests that the boron content in the ternary phase has a maximum near x=3.0. No peaks from unreacted $MgB_2$ were observed in any of the compositions.

The following hydrogen storage compositions were studied for hydrogenation/dehydrogenation as discussed above in Example 2 for the $MgNi_{2.5}B_2/LiH/MgH_2$ hydrogen storage composition. The results for hydrogenation/dehydrogenation with the following compositions were similar to those discussed above for the $MgNi_{2.5}B_2/LiH/MgH_2$ hydrogen storage composition:

$MgNiB_2/LiH/MgH_2$
$MgNi_2B_2/LiH/MgH_2$
$MgNi_3B_2/LiH/MgH_2$

It is interesting to note that attempts have been reported to hydrogenate $MgNi_3B_2$ in the absence of metal hydrides; these attempts were unsuccessful.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A hydrogen storage composition comprising:
    (a) a ternary alloy comprising magnesium, boron and a metal wherein the ternary alloy has the formula:

$Mg_kM_nB_m$ wherein:
    k, m and n represent molar ratios,
    k is a number between 1 and 50 including fractions thereof,
    m is a number between 1 and 15 including fractions thereof,
    n is a number between 1 and 50 including fractions thereof, and
    M is a metal selected from the group consisting of metals of Groups 1-2, Periods 2-6, Groups 3-12, Periods 4-6, Group 13, Periods 3-6, Group 14, Periods 4-6 and Group 15, Periods 4-6, of the Standard Periodic Table and combinations of two or more of the metals and wherein a molar ratio of the metal, magnesium and boron in the ternary alloy provides a boron species for generating hydrogen reversibly from borohydride anions; and
    (b) a metal hydride independently selected from the group consisting of a metal hydride of Li, a metal hydride of Mg and a combination of a metal hydride of Li and a metal hydride of Mg, wherein the ternary alloy and the metal hydride are in an amount sufficient to render the composition capable of hydrogen storage, and wherein the amount of the metal hydride in the hydrogen storage composition is about 1 to about 5 moles or more per mole of the ternary alloy.

2. The composition according to claim 1, wherein in the formula:

$Mg_kM_nB_m$:

k is a number between 1 and 10 including fractions thereof,
    m is a number between 1 and 5 including fractions thereof, and
    n is a number between 1 and 10 including fractions thereof.

3. The composition according to claim 1, wherein M is a metal selected from the group consisting of Ni, Fe, Co and Cu and combinations of two or more of the metals.

4. The composition according to claim 1, wherein M is a metal selected from the group consisting of Li, Na, K, Rb, Be, Mg, Ca, Sr, Sc, Ti, V, Cr, Mn, Fe, Co, Ni, Cu, Zn, Y, Zr, Nb, Mo, Tc, Ru, Rh, Pd, Ag, Cd, Al, Ga, Sn, Bi and combinations thereof.

5. The composition according to claim 1, wherein the alloy has the formula: $MgM_mB_2$ wherein m is a number between 2.5 and 3.

6. The composition according to claim 5, wherein M is Ni.

7. The composition of claim 1, wherein the metal hydride is a metal hydride of Li.

8. The composition of claim 1, wherein the metal hydride is a metal hydride of Mg.

9. The composition of claim 1, wherein the alloy has the formula $MgM_{2.5}B_2$ or $MgM_3B_2$ and the metal hydride is a combination of LiH and $MgH_2$.

10. The composition of claim 9, wherein M is Ni.

11. A hydrogen storage composition comprising:
    (a) a ternary alloy of the formula: $Mg_kM_nB_m$ wherein:
    k, m and n represent molar ratios,
    k is a number between 1 and 50 including fractions thereof,
    m is a number between 1 and 15 including fractions thereof,
    n is a number between 1 and 50 including fractions thereof, and
    M is a metal selected from the group consisting of metals of Groups 1-2, Periods 2-6, Groups 3-12, Periods 4-6, Group 13, Periods 3-6, Group 14, Periods 4-6, and Group 15, Periods 4-6, of the Standard Periodic Table and combinations of two or more of the metals; and (b) a metal hydride wherein the metal of the metal hydride is independently selected from the group consisting of metals of Groups 1, 2, 13 and Group 3-12, Period 4, of the Standard Periodic Table, wherein the ternary alloy and the metal hydride are in an amount sufficient to render the composition capable of hydrogen storage.

12. The composition according to claim 11, wherein metal M of the alloy is selected from the group consisting of Li, Na, K, Rb, Be, Mg, Ca, Sr, Sc, Ti, V, Cr, Mn, Fe, Co, Ni, Cu, Zn, Y, Zr, Nb, Mo, Tc, Ru, Rh, Pd, Ag, Cd, Al, Ga, Sn, Bi and combinations thereof.

13. The composition of claim 11, wherein the metal of the metal hydride is selected from the group consisting of Li, Mg, Ca and Al.

14. The composition of claim 12, wherein the alloy has the formula $MgM_{2.5}B_2$ or $MgM_3B_2$ and the metal hydride is a combination of $LiH$ and $MgH_2$.

15. The composition of claim 14, wherein M is Ni.

16. A method of preparing a hydrogen storage composition, the method comprising:
(a) heating a combination of magnesium, boron and a metal at a temperature greater than about 500° C. to prepare a ternary alloy wherein a molar ratio of the metal to magnesium and boron in the ternary alloy provides a boron species for generating hydrogen reversibly from borohydride anions and wherein the ternary alloy has the formula:

$$Mg_kM_nB_m$$

wherein:
k, m and n represent molar ratios,
k is a number between 1 and 50 including fractions thereof,
m is a number between 1 and 15 including fractions thereof,
n is a number between 1 and 50 including fractions thereof, and M is a metal selected from the group consisting of metals of Groups 1-2, Periods 2-6, Groups 3-12, Periods 4-6, Group 13, Periods 3-6, Group 14, Periods 4-6 and Group 15, Periods 4-6, of the Standard Periodic Table and combinations of two or more of the metals; and (b) subjecting a combination of the ternary alloy with a metal hydride in powder form to mechanical milling to form a hydrogen storage composition, wherein the metal of the metal hydride is independently selected from the group consisting of metals of Groups 1, 2, 13 and Group 3-12, Period 4, of the Standard Periodic Table, and wherein the ternary alloy and the metal hydride are in an amount sufficient to render the composition capable of hydrogen storage, and wherein the amount of the metal hydride in the hydrogen storage composition is about 1 to about 5 moles or more per mole of the ternary alloy.

17. The method according to claim 16, wherein in the formula:

$$Mg_kM_nB_m:$$

k is a number between 1 and 10 including fractions thereof,
m is a number between 1 and 5 including fractions thereof, and
n is a number between 1 and 10 including fractions thereof.

18. The method according to claim 16, wherein M is a metal selected from the group consisting of Li, Na, K, Rb, Be, Mg, Ca, Sr, Sc, Ti, V, Cr, Mn, Fe, Co, Ni, Cu, Zn, Y, Zr, Nb, Mo, Tc, Ru, Rh, Pd, Ag, Cd, Al, Ga, Sn, Bi and combinations thereof.

19. The method according to claim 16, wherein the metal of the metal hydride is selected from the group consisting of Li, Mg, Ca and Al.

20. The method according to claim 16, further comprising hydrogenating the composition by (i) heating the composition under pressure in the presence of hydrogen at a temperature and for a period sufficient for the composition to absorb hydrogen and (ii) slowly cooling the composition to ambient temperature.

* * * * *